United States Patent [11] 3,590,977

[72] Inventor Arthur Stanford
 Richmond, Va.
[21] Appl. No. 829,564
[22] Filed June 2, 1969
[45] Patented July 6, 1971
[73] Assignee AMF Incorporated

[54] VARIABLE INDEX FINGER ASSEMBLY
 1 Claim, 4 Drawing Figs.
[52] U.S. Cl. ................................................ 198/34,
[51] Int. Cl. ........................................... B65g 47/26
[50] Field of Search ....................................... 198/34

[56] References Cited
UNITED STATES PATENTS
2,771,177 11/1956 Cutter et al. ................ 198/34
3,231,062 1/1966 Phillips, Jr. et al. ........... 198/34

Primary Examiner—Andres H. Nielsen
Attorneys—George W. Price and Barry H. Fishkin ABSTRACT: Apparatus for metering articles, which comprises conveyor means, gating means mounted adjacent said conveyor means, means for moving said gating means between a first position whereat it is operable to block articles being advanced by said conveyor means and a second, inactive, position, and means for adjusting the position of said gating means longitudinally with respect to said conveyor means.

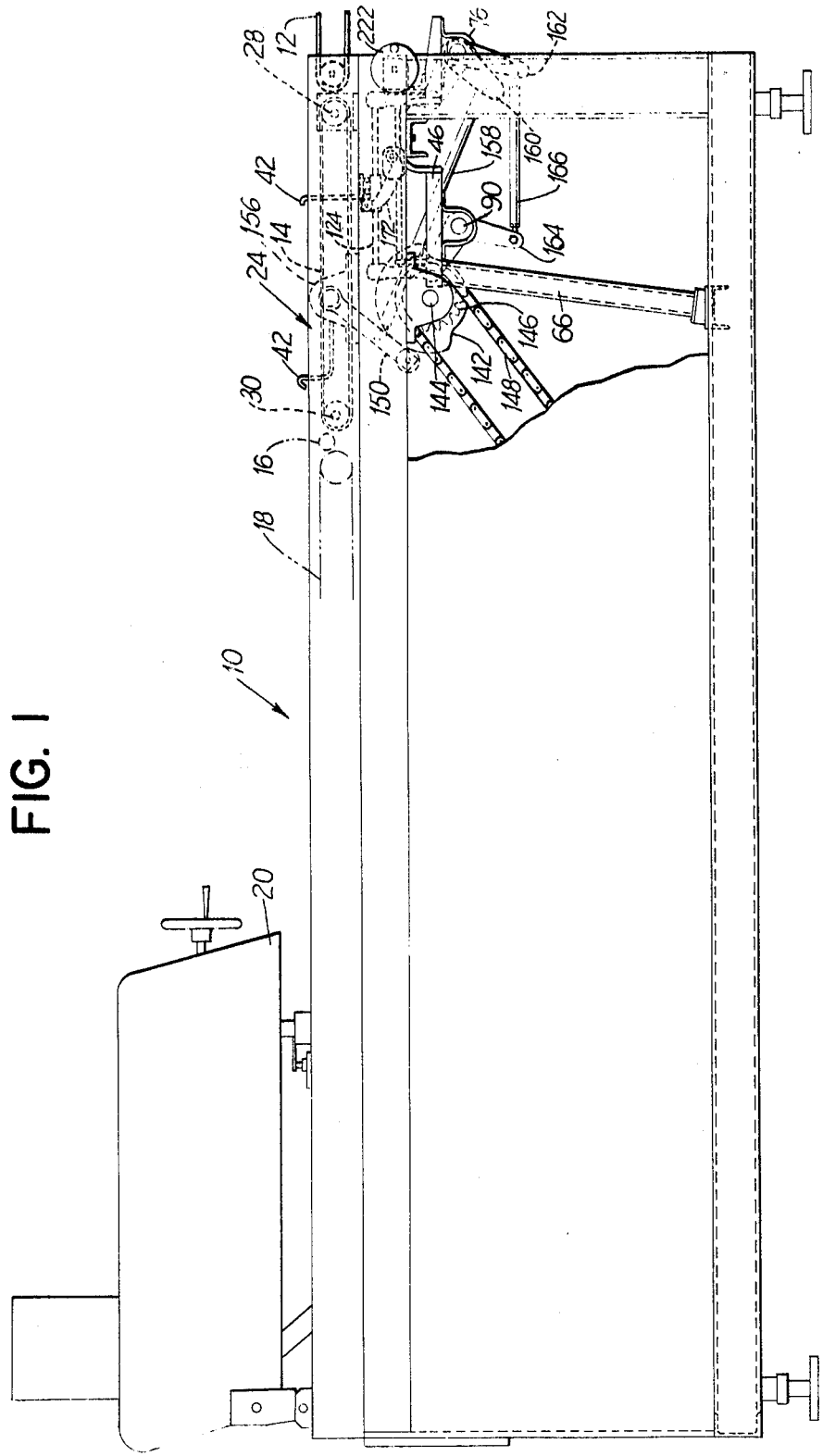

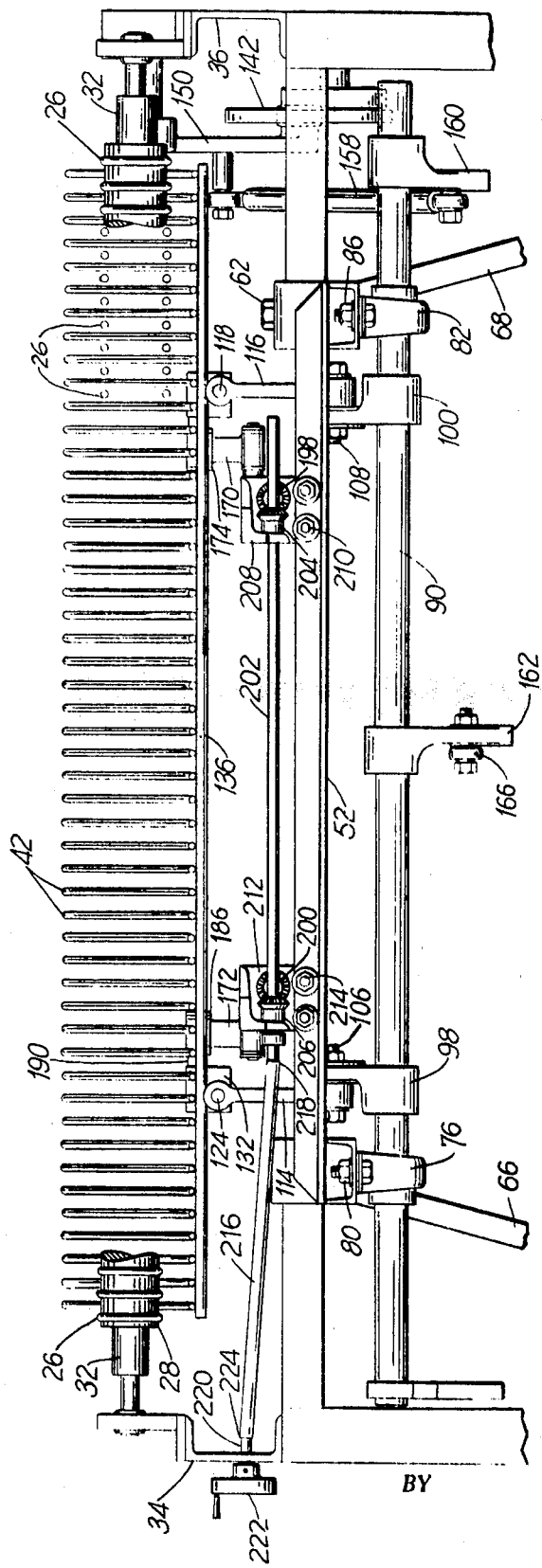

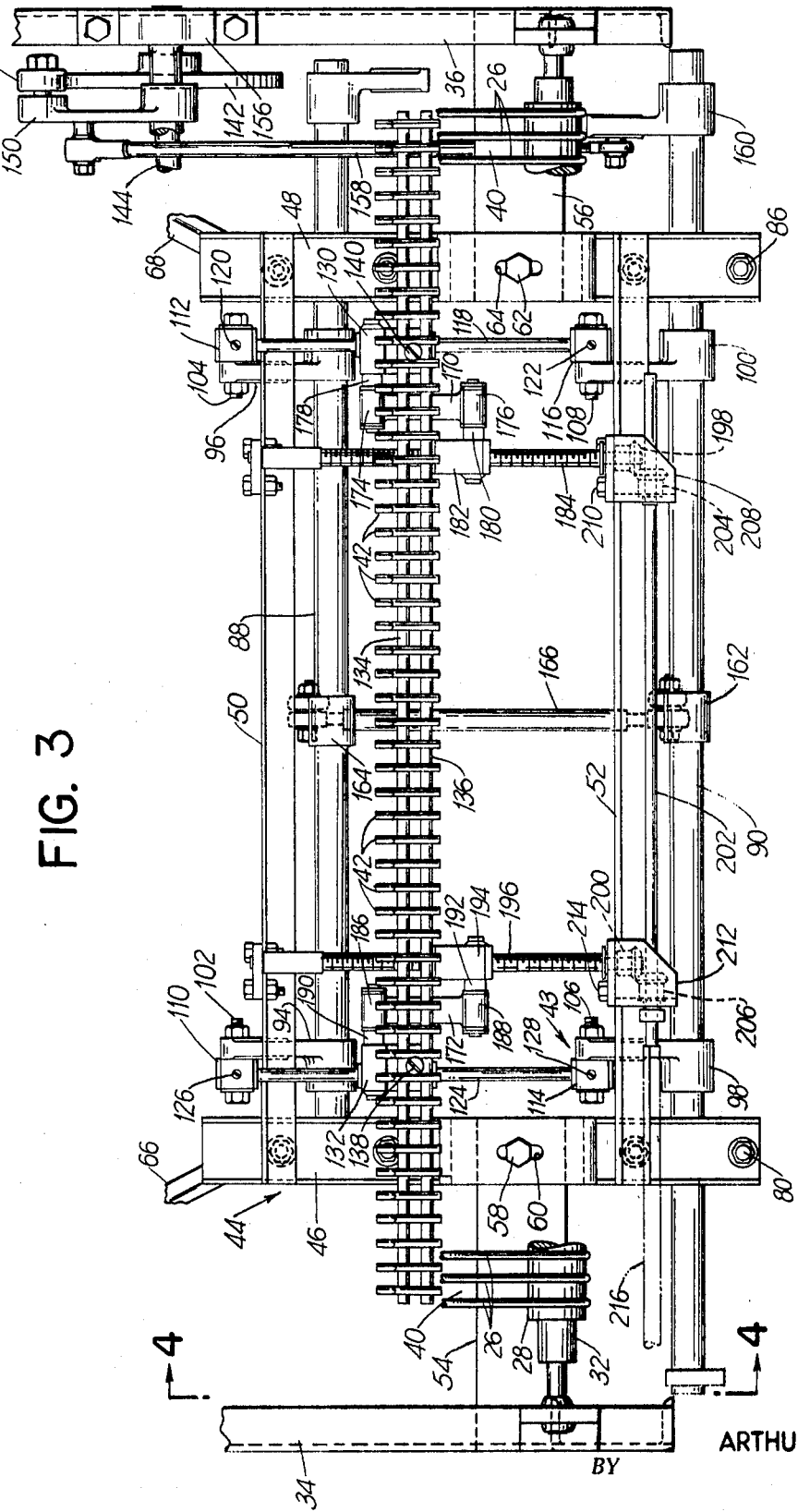

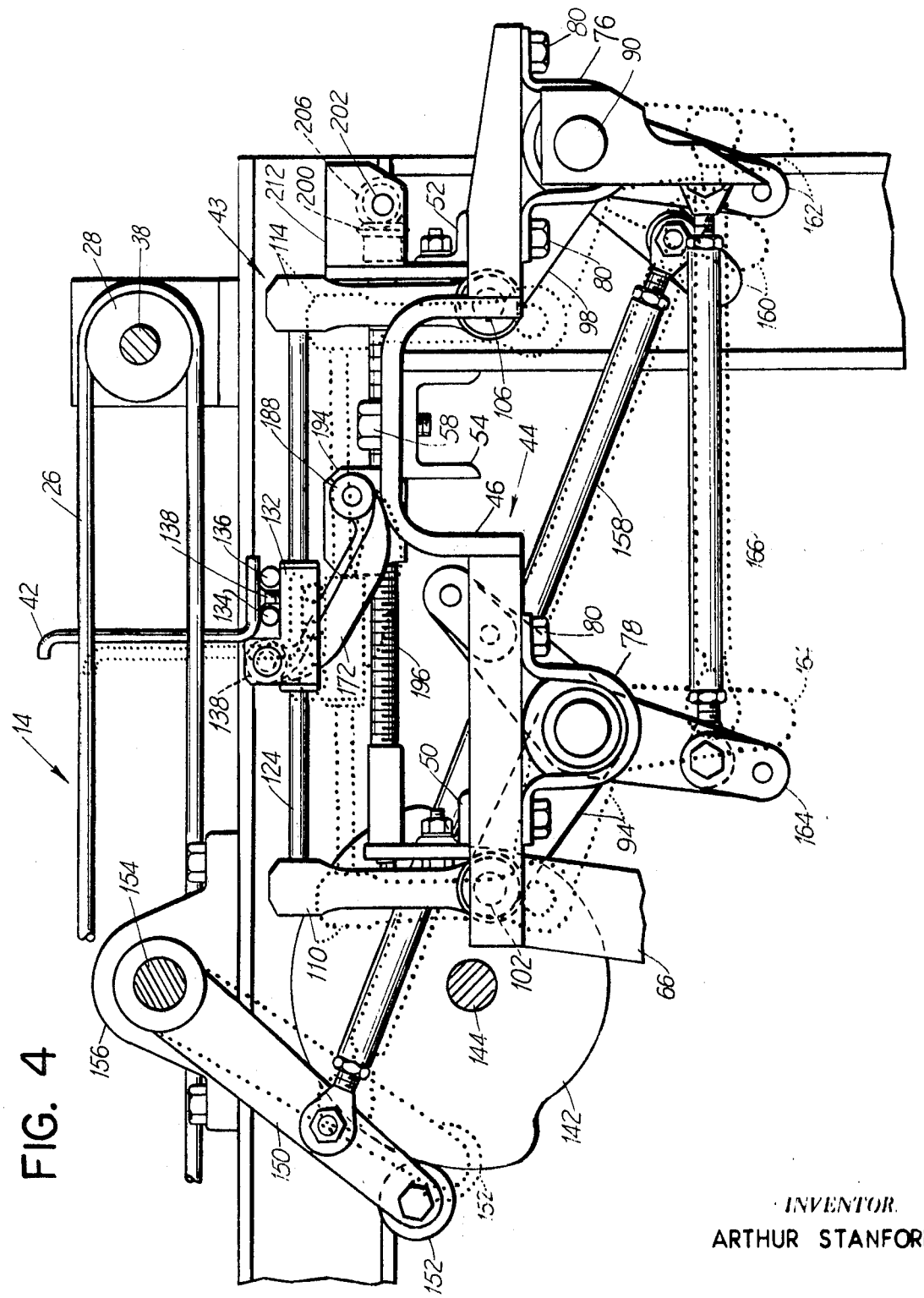

VARIABLE INDEX FINGER ASSEMBLY

BACKGROUND

This invention relates to the packaging of articles and more specifically to apparatus adapted to package a wide range of different sized and shaped articles.

Packaging machinery in general is large and complex and, therefore, expensive. Accordingly, the more flexible and adaptable packaging equipment is to different commodities and for different sizes and shapes of the same commodity, the more useful and economical it becomes.

Packaging machines are commonly cyclical in operation, and articles to be packaged are usually metered into the actual packaging portion of the machine so they arrive thereat at the beginning of a cycle. This metering is commonly effected by cam operated finger assemblies or similarly timed stop means that are cyclical in operation and coupled to the machine infeed so that each article is started into the machine at the same predetermined time. In many cases, several finger assemblies are utilized in a metering operation to retain control of articles as they are conveyed through a series of prepackaging operations. It is, however, important that means be provided to adapt the metering system to varying articles sizes and shapes.

SUMMARY

It is, therefore, an object of this invention to provide apparatus operable to meter articles from varying positions.

It is a further object of this invention to provide apparatus for stopping conveyed articles at varying positions along the conveyor.

It is a more specific object of this invention to provide an index finger assembly in combination with a conveyor where said index finger assembly is movable longitudinally with respect to the conveyor.

In accordance with these and other objects, apparatus according to the invention may comprise conveyor means, gating means mounted adjacent said conveyor means, means for moving said gating means into and away from a position whereat it blocks the movement of articles on said conveyor and means for adjusting the position of said gating means longitudinally with respect to said conveyor means.

DESCRIPTION OF THE DRAWINGS

FIG. 1 is a side elevation view of apparatus according to a preferred embodiment of the invention.

FIG. 2 is an end elevation view of a portion of the apparatus shown in FIG. 1.

FIG. 3 is a plan view of a portion of the apparatus shown in FIG. 1.

FIG. 4 is an enlarged side elevation view of a portion of the apparatus shown in FIG. 1.

DESCRIPTION OF PREFERRED EMBODIMENT

With reference to the drawings, apparatus according to the invention is shown in conjunction with a packaging apparatus 10 which includes a first conveyor 12 operable to advance articles or groups thereof in a random fashion, a second conveyor 14 operable to receive articles from conveyor 12 and transport them over a transition roller 16 to a further conveyor 18 which is the infeed of a prepackaging operation subcombination 20 and indexing finger assemblies 22 and 24, mounted adjacent conveyor 14 for placing the articles thereon in a predetermined spaced sequence.

The conveyor 14 includes a plurality of springs 26 mounted between a pair of spaced rollers 28 and 30. Roller 28 is mounted on a shaft 32 that is rotatably mounted between a pair of opposed machine side frame members 34 and 36. Roller 30 is similarly mounted between side frame members 34 and 36.

The spacing of springs 26 along rollers 28 and 30 defines a plurality of gaps 40 therebetween. The index finger assemblies 22 and 24 each include a plurality of fingers 42 mounted on shafts in positions in spaced relationship with the gaps 40 between the spring conveyor 14. These fingers are operable to be raised through gaps 40 to a position above springs 26 whereat they are operable to halt objects being advanced down the conveyor.

To enable the apparatus to accommodate articles of varying sizes and shapes, the initial index finger assembly 22 is mounted for longitudinal movement with respect to conveyor 14 as well as the usual up and down movement with respect to the conveyor. Index finger assembly 24 is mounted only for up and down movement.

The longitudinal capability of index finger assembly allows the first index stop of articles to be adjusted with respect to the interface between conveyors 12 and 14 where, since the latter is driven at a faster speed than the former, gaps are placed in the succession of articles being advanced.

The longitudinal movement capability of index finger assembly 22 enables, in the case of large articles, the assembly to be moved far enough away from the interface to enable an article to come all the way onto conveyor 14 plus leave a gap therebehind before it is stopped, and in the case of small articles, to move closer to the interface to get control of the articles as soon as possible. In both instances this precludes bunching of articles behind the index finger assembly and resultant injury of the articles.

Referring now to FIGS. 3 and 4, the index finger assembly 22 is mounted for movement between upper and lower positions with respect to conveyor 14 on a movable support 43 which is mounted in turn in a static frame 44.

The static frame 44 includes two longitudinally extending members 46 and 48 with spaced lateral members 50 and 52 mounted therebetween and is mounted to machine side frame members 34 and 36 by a pair of struts 54 and 56. Strut 54 is connected at one end thereof to machine side frame member 34 and at the other end thereof supports longitudinally extending member 46, the connection therebetween being made by a nut and bolt combination 58. A slot 60 is provided in longitudinally extending member 48 and the nut and bolt combination 58 extends there through.

In a similar fashion, strut 56 is connected at one end thereof to machine side frame member 36 and supports longitudinally extending member 48 at the other end thereof, the connection being made therebetween by a nut and bolt combination 62. Longitudinally extending member 48 is provided with a slot 64 similar to slot 60 and with this arrangement the position of the static frame 44 may be adjusted longitudinally with respect to the rest of the machine if desired.

Additional support for static frame 44 is provided by channel members 66 and 68 which are mounted on the base of the machine and extend upwardly therefrom to be bolted to the rear ends of longitudinally extending members 46 and 48 respectively.

A pair of spaced brackets 76 and 78 are mounted by bolts 80 to the underside of longitudinally extending member 46. In a similar fashion, a pair of brackets 82 and 84 are bolted to the underside of longitudinally extending member 48 by bolts 86.

Movable frame 43 includes a first shaft 88 journaled in brackets 78 and 84 and a second shaft 90 journaled in brackets 76 and 82. A pair of rocker arms 94 and 96 are mounted on shaft 88 and a pair of rocker arms 98 and 100 are mounted on shaft 90, with rocker arms 94 and 98 being in spaced relationship with each other, as are rocker arms 96 and 100.

A connecting pin 102 is pivotally mounted on the distal end of rocker arm 94. In a like manner, connecting pins, designated 104, 106, and 108, are pivotally mounted at the distal ends of rocker arms 96, 98 and 100, respectively. A vertically extending mounting rod 110 is pivotally mounted on connecting pin 102 and in a similar fashion, vertically extending rods 112, 114, and 116 are mounted on connecting pins 104, 106 and 108, respectively.

A shaft 118 is mounted between the upper ends of vertically extending rods 112 and 116, being secured thereon by screws 120 and 122 respectively, and a like shaft 124, is mounted between the upper ends of vertically extending rods 110 and 114 in spaced relationship to shaft 118, being secured in the vertically extending rods 110 and 114 by screws 126 and 128 respectively. A carriage 130 is slidably mounted on shaft 118 of movable frame 43 and a like carriage 132 is slidably mounted on shaft 124.

Index finger assembly 22 includes spaced rods 134 and 136 and is mounted on carriages 130 and 132 by screws 138 and 140 respectively. Indexing fingers 42 are affixed to the rods 134 and 136 by any convenient manner as, for example, spot welding.

With reference to FIGS. 1 and 4, the index finger assembly 22 is moved cyclically between raised and lowered positions (shown in solid and phantom respectively in FIG. 4) to provide a metering function by oscillation of the movable frame 43.

The pivoting of the shafts 88 and 90 of movable frame 43 is controlled by a cam 142. Cam 142 is mounted on a shaft 144 which is driven by a sprocket 146 mounted thereon and a chain 148 connected to the machine drive (not shown).

A cam follower 150 having a roller 152 that rides on cam 142 is pivotally mounted on a shaft 154 journaled in a bracket 156 bolted to machine side frame member 36 and a like bracket (not shown) bolted to side frame member 34. A link 158 is mounted at one end thereof to cam follower 150 and at the other end thereof to a lever 160 (best seen in FIG. 3) affixed to shaft 90.

A second lever 162 is mounted on shaft 90 and a lever 164 is mounted on shaft 88 in spaced relationship therewith. A connecting rod 166 between levers 162 and 164 is operable to transmit the pivotal movement of shaft 90 and to shaft 88.

With this arrangement, in operation, as cam 142 rotates and the cam follower roller 152 rides from the high portion of the cam onto the low portion thereof, link 158 is advanced to the right as seen in FIG. 4, pivoting a lever 160 in a counterclockwise direction. This causes shaft 90 to be pivoted in a counterclockwise direction, causing rocker arms 98 and 100, mounted thereon, to also be pivoted in the same direction. At the same time, rocker arms 94 and 96 are also pivoted in a counterclockwise direction since the pivoting movement of shaft 90 is transmitted to shaft 88 through levers 162 and 164 and connecting rod 166.

This counterclockwise movement of rocker arms 94, 96, 98 and 100 causes the lowering of their distal ends, causing in turn a lowering of vertically extending rods 110, 112, 114 and 116 and thus shafts 118 and 124. This lowers carriages 130 and 132, which are mounted on shafts 118 and 124, and in turn causes the lowering of index finger assembly 22, which is mounted on carriages 130 and 132. This lowering of the index finger assembly 22 results in the fingers 42 thereof being moved to a position whereat they are below springs 26 and not operable to halt objects being advanced thereby.

When cam follower roller 152 rides back up into the high portion of the cam 142, link 158 is drawn back to the left as seen in FIG. 4, causing lever 160 to be pivoted in a clockwise direction, which causes shaft 90 and rocker arms 98 and 100 thereon to be pivoted in a clockwise direction and shaft 88 and rocker arms 94 and 96 thereon to also be pivoted in that direction through levers 162 and 164 and connecting rod 166. This clockwise movement of the rocker members raises their distal ends, causing the raising of vertically extending rods 110, 112, 114 and 116 and thus shafts 118 and 124, raising carriages 130 and 132 and thus index finger assembly 22. This raises the fingers 42 thereon through gaps 40 between springs 26 to positions thereable whereat they are in position to block the movement of objects being advanced down conveyor 14 by springs 26.

Since cam 142 is driven continuously by chain 148, the index finger assembly is raised and lowered cyclically in the above manner to meter articles towards prepackaging subcombination 20.

As stated hereinabove, in addition to the cyclical movement between upper and lower positions, the index finger assembly 22 is movable longitudinally with respect to conveyor 14. This capability is independent of the cam operated assembly for cyclically raising and lowering the index finger assembly. As stated above the index finger assembly 22 is mounted on carriages 130 and 132 which are slidable on shafts 118 and 124 respectively.

With reference to FIGS. 2 and 4, longitudinal movement with respect to conveyor 14 is imparted to carriages 130 and 132 and thus to index finger assembly 22 through a pair of struts 170 and 172 respectively.

Strut 170 includes enlarged portions 174 and 176 at the ends thereof formed to receive a pair of connecting rods, 178 and 180 respectively. Connecting rod 178 is connected to carriage 130 and connecting rod 180 is connected to a carriage 182 mounted on a threaded rod 184 mounted between spaced lateral members 50 and 52.

Strut 172 includes enlarged portions 186 and 188 at the ends thereof formed to receive connecting rods 190 and 192 respectively. Connecting rod 190 is connected to carriage 132 and connecting rod 192 is connected to a carriage 194 mounted on a threaded rod 196 mounted between spaced lateral members 50 and 52. With this arrangement, rotation of threaded rods 184 and 196 will cause the longitudinal movement therealong of carriages 182 and 194, the direction of movement of the carriage along the threaded rods depending on the direction of rotation thereof.

A pair of bevel gear members 198 and 200, are mounted on threaded rods 184 and 196 respectively at the ends thereof adjacent lateral member 52. A shaft 202 is mounted in spaced relationship with lateral member 52 and includes bevel gear members 204 and 206 mounted thereon in positions predetermined such that they mesh with bevel gear members 198 and 200. A housing 208 is bolted to lateral member 52 by bolts 210 to afford protection to gear members 198 and 204. A like housing 212 is bolted to lateral member 52 by bolts 214 and provides protection for gear members 200 and 206.

Referring now to FIG. 2, shaft 202 is connected to a rod 216 by a universal connection 218. A shaft 220 is rotatably mounted in machine side frame member 34 and includes a handle 222 at one end thereof. A universal connection 224 transmits the rotation of shaft 220 induced by rotation of handle 222 to rod 216, which rotation is in turn transmitted to shaft 202 by universal connection 218. Thus, rotation of handle 222 rotates bevel gears 204 and 206 and thus threaded rods 184 and 196. This moves carriages 182 and 194 which in turn slide carriages 130 and 132 along shafts 118 and 124 respectively, effecting the longitudinal movement of the index finger assembly 22.

Having now fully set forth both structure and operation of preferred embodiments of the concept underlying the present invention, it may be that various other embodiments as well as certain variations and modifications of the embodiments herein shown and described will occur to those skilled in the art upon becoming familiar with said underlying concept. All such embodiments, variations, and modifications as incorporate the spirit of the invention and depend upon its underlying concept are consequently to be considered as within the scope of the claims appended herebelow, unless the claims by their language expressly state otherwise.

I claim:

1. Apparatus for metering articles, which comprises:
spring conveyor means including a plurality of endless springs mounted between spaced rollers and having gaps therebetween,
a pair of rods mounted beneath said spring conveyor means, said rods being oriented parallel to the springs of the spring conveyor,
a carriage slidably mounted on each of said rods,
shaft means mounted on said two carriages and oriented transversely of said springs of the spring conveyor means,
a plurality of index fingers mounted on said shaft means in positions spaced from the gaps between the springs of the spring conveyor, means for oscillating said rods between a first position whereat the index fingers are in a position to block articles being advanced by the spring conveyor and a second inactive position, and
means for moving said carriages longitudinally along said rods.